United States Patent
Lee et al.

(10) Patent No.: US 12,233,942 B2
(45) Date of Patent: Feb. 25, 2025

(54) VEHICLE FRONT PILLAR REINFORCEMENT SYSTEM

(71) Applicants: Hyundai Motor Company, Seoul (KR); Kia Corporation, Seoul (KR)

(72) Inventors: Seung Won Lee, Yongin-si (KR); Kang San Lee, Suwon-si (KR); Keon Woo Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 291 days.

(21) Appl. No.: 17/929,121

(22) Filed: Sep. 1, 2022

(65) Prior Publication Data
US 2023/0303181 A1 Sep. 28, 2023

(30) Foreign Application Priority Data
Mar. 25, 2022 (KR) .................. 10-2022-0037592

(51) Int. Cl.
*B62D 25/04* (2006.01)
*B62D 25/02* (2006.01)

(52) U.S. Cl.
CPC ............. *B62D 25/04* (2013.01); *B62D 25/02* (2013.01); *B62D 25/025* (2013.01)

(58) Field of Classification Search
CPC ...... B62D 25/02; B62D 25/025; B62D 25/04; B62D 25/2018; B62D 25/2036; B62D 25/2045; B62D 27/023
USPC .................................................. 296/193.06
See application file for complete search history.

(56) References Cited

U.S. PATENT DOCUMENTS

| | | | | |
|---|---|---|---|---|
| 4,944,553 A | * | 7/1990 | Medley | B62D 25/025 296/203.03 |
| 8,469,442 B1 | * | 6/2013 | Pencak | B62D 25/16 296/198 |
| 2003/0146649 A1 | * | 8/2003 | Kim | B62D 25/04 296/202 |
| 2016/0101815 A1 | * | 4/2016 | Schnug | B62D 25/025 29/428 |
| 2016/0194032 A1 | * | 7/2016 | Yamamoto | B62D 21/15 296/193.05 |
| 2017/0203792 A1 | * | 7/2017 | Sunohara | B62D 25/025 |
| 2017/0313358 A1 | * | 11/2017 | Narahara | B62D 21/15 |
| 2019/0002027 A1 | * | 1/2019 | Park | B62D 25/025 |
| 2019/0061824 A1 | * | 2/2019 | Uchiba | B62D 21/152 |
| 2020/0086923 A1 | * | 3/2020 | Fukushi | B62D 25/04 |
| 2020/0140017 A1 | * | 5/2020 | Schuppert | B62D 25/025 |
| 2020/0317272 A1 | * | 10/2020 | Hong | B62D 25/081 |
| 2021/0260974 A1 | * | 8/2021 | Miura | B60J 5/047 |
| 2021/0387675 A1 | * | 12/2021 | Kubozono | B62D 27/023 |
| 2022/0073141 A1 | * | 3/2022 | Shimizu | B62D 25/14 |
| 2022/0135140 A1 | * | 5/2022 | Matsuoka | B62D 25/04 296/203.03 |
| 2022/0177041 A1 | * | 6/2022 | Hong | B62D 25/025 |

(Continued)

*Primary Examiner* — Gregory A Blankenship
(74) *Attorney, Agent, or Firm* — Slater Matsil, LLP

(57) ABSTRACT

An embodiment front pillar reinforcement system of a vehicle includes a front pillar inner having a first plurality of walls defining a first cavity, a front pillar outer facing the front pillar inner and having a second plurality of walls defining a second cavity, and a front pillar inner reinforcement received in the first cavity of the front pillar inner and having a third plurality of walls coupled to the first plurality of walls of the front pillar inner, respectively.

20 Claims, 9 Drawing Sheets

(56) References Cited

U.S. PATENT DOCUMENTS

2023/0044592 A1*  2/2023  Park ..................... B62D 21/152
2023/0303175 A1*  9/2023  Ham ..................... B62D 21/15
2023/0303181 A1*  9/2023  Lee ................... B62D 25/2036
2023/0303182 A1*  9/2023  Kim .................... B62D 25/025
2023/0303183 A1*  9/2023  Kim ..................... B62D 25/04
2024/0217586 A1*  7/2024  Lee .................... B62D 25/025

* cited by examiner

VEHICLE FRONT PILLAR REINFORCEMENT SYSTEM

CROSS-REFERENCE TO RELATED APPLICATIONS

This application claims the benefit of Korean Patent Application No. 10-2022-0037592, filed on Mar. 25, 2022, which application is hereby incorporated herein by reference.

TECHNICAL FIELD

The present disclosure relates to a vehicle front pillar reinforcement system.

BACKGROUND

As is known in the art, a vehicle front structure includes a dash panel by which a front compartment and a passenger compartment are divided, a pair of front side members located in front of the dash panel, and a pair of front pillars fixed to opposed sides of the dash panel. The pair of front side members may be spaced apart from each other in a width direction of the vehicle on the front of the vehicle. A pair of side sills may be connected to the pair of front side members through a pair of rear lower members, respectively, and the pair of side sills may be disposed on opposed side edges of a floor, respectively. A front portion of each side sill may be connected to a rear portion of the corresponding front side member through the corresponding rear lower member. The front portion of each side sill may be fixed to the rear portion of the corresponding front pillar.

In an existing internal combustion engine vehicle, the front side member, the rear lower member, and the side sill may be connected in a longitudinal direction of the vehicle so that the front side member, the rear lower member, and the side sill may define a load path in the longitudinal direction of the vehicle.

In an electric vehicle, a battery assembly may be mounted under a floor so that the electric vehicle may be designed to avoid or minimize the transfer of an impact load or impact energy to the battery assembly. To this end, some electric vehicles may be designed to distribute a portion of the impact load from the front side member to the lower portion of the front pillar and the side sill. However, as the impact load is transferred to the lower portion of the front pillar, it may be concentrated on the lower portion of the front pillar, which may increase the risk of breakage of the front pillar. In particular, since a center-pillarless vehicle does not have a center pillar (referred to as a B-pillar), the load may be concentrated on the front pillar, which may further increase the risk of breakage of the front pillar.

In addition, flanges of the side sill may be fixed to the front pillar, and accordingly connection stiffness between the side sill and the front pillar may be relatively reduced.

The above information described in this background section is provided to assist in understanding the background of the inventive concept, and may include any technical concept which is not considered as the prior art that is already known to those skilled in the art.

SUMMARY

The present disclosure relates to a vehicle front pillar reinforcement system. Particular embodiments relate to a vehicle front pillar reinforcement system that improves strength and stiffness of a front pillar.

Embodiments of the present disclosure can solve problems occurring in the prior art while advantages achieved by the prior art are maintained intact.

An embodiment of the present disclosure provides a vehicle front pillar reinforcement system improving strength and stiffness of a front pillar, thereby sufficiently withstanding an impact load transferred to the front pillar.

According to an embodiment of the present disclosure, a vehicle front pillar reinforcement system may include a front pillar inner having a plurality of walls defining a cavity, a front pillar outer facing the front pillar inner, and having a plurality of walls defining a cavity, and a front pillar inner reinforcement received in the cavity of the front pillar inner, and having a plurality of walls coupled to the plurality of walls of the front pillar inner, respectively.

As the front pillar inner reinforcement is received in the cavity of the front pillar inner, strength of the front pillar inner may be improved. When an impact load is transferred to the front pillar inner, deformation of the front pillar inner may be minimized or prevented.

The front pillar inner may include an inboard side wall facing the interior of the vehicle, a front wall facing the front of the vehicle, and a rear wall facing the rear of the vehicle, and the cavity of the front pillar inner may be defined by the inboard side wall, the front wall, and the rear wall.

The front pillar inner reinforcement may include an inboard side wall coupled to the inboard side wall of the front pillar inner, a front wall coupled to the front wall of the front pillar inner, and a rear wall coupled to the rear wall of the front pillar inner.

The vehicle front pillar reinforcement system may further include a front pillar outer reinforcement received in the cavity of the front pillar outer, and having a plurality of walls coupled to the plurality of walls of the front pillar outer, respectively.

As the front pillar outer reinforcement is received in the cavity of the front pillar outer, strength of the front pillar outer may be improved. When an impact load is transferred to the front pillar outer, deformation of the front pillar outer may be minimized or prevented.

The front pillar outer may include an outboard side wall facing the exterior of the vehicle, a front wall facing the front of the vehicle, and a rear wall facing the rear of the vehicle, and the cavity of the front pillar outer may be defined by the outboard side wall, the front wall, and the rear wall.

The front pillar outer reinforcement may include an outboard side wall coupled to the outboard side wall of the front pillar outer, a front wall coupled to the front wall of the front pillar outer, and a rear wall coupled to the rear wall of the front pillar outer.

The vehicle front pillar reinforcement system may further include a lower reinforcement received in the cavity of the front pillar outer and located below the front pillar outer reinforcement. The lower reinforcement may have a plurality of walls coupled to the plurality of walls of the front pillar outer, respectively.

The lower reinforcement may include an outboard side wall coupled to the outboard side wall of the front pillar outer, a front wall coupled to the front wall of the front pillar outer, and a rear wall coupled to the rear wall of the front pillar outer.

The vehicle front pillar reinforcement system may further include a side sill inner coupled to the front pillar inner and a side sill front member coupled to a front portion of the side sill inner. The side sill front member may connect the front pillar inner and the side sill inner.

As the side sill front member connects the front pillar inner and the side sill inner, connection stiffness between the front pillar and the side sill may be improved.

The side sill front member may include an upper portion coupled to the front pillar inner and a lower portion coupled to the front portion of the side sill inner.

The vehicle front pillar reinforcement system may further include a front reinforcement coupled to the front portion of the side sill inner, and the front reinforcement may partially overlap a portion of the front pillar and a portion of the side sill and be fixed therebetween.

As the front reinforcement partially overlaps the front pillar and the side sill, connection stiffness between the front pillar and the side sill may be improved.

The front pillar inner may have a recessed wall which is recessed from the inboard side wall toward the exterior of the vehicle. The front reinforcement may include an upper portion interposed between the recessed wall of the front pillar inner and an upper portion of the side sill front member and a lower portion coupled to the front portion of the side sill inner.

As the front reinforcement is interposed and fixed between the recessed wall of the front pillar inner and the side sill front member, connection stiffness between the front pillar and the side sill may be sufficiently secured.

The vehicle front pillar reinforcement system may further include a rear lower member coupled to the front pillar inner and the side sill inner and a front side member extending from the rear lower member toward the front of the vehicle. The rear lower member may include an upper extension portion coupled to the front pillar inner and a lower extension portion coupled to the side sill inner.

The upper extension portion may be aligned with the front pillar inner reinforcement.

As the upper extension portion is aligned with the front pillar inner reinforcement, stiffness of the front pillar inner may be improved.

The upper extension portion may include a front flange fixed to the front wall of the front pillar inner and a rear flange fixed to the inboard side wall of the front pillar inner.

As the upper extension portion is coupled to the front pillar inner through the front flange and the rear flange, connection stiffness between the rear lower member and the front pillar may be sufficiently secured.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
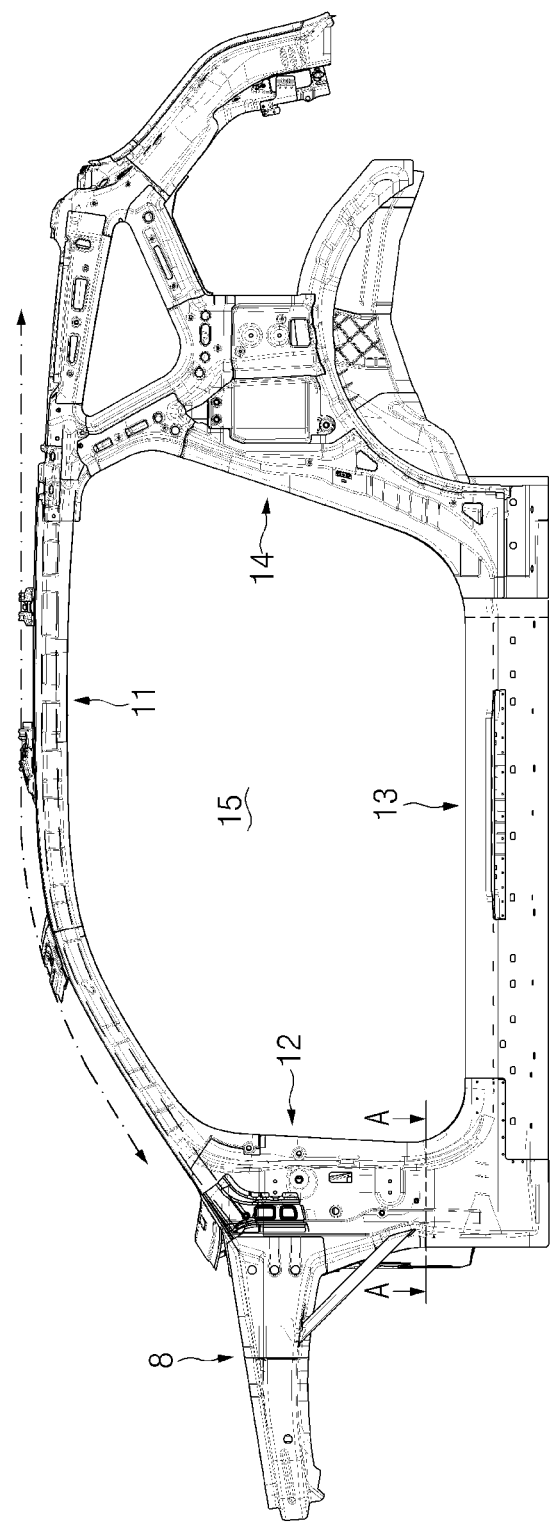
FIG. 1 illustrates a side view of a vehicle body structure to which a vehicle front pillar reinforcement system according to an exemplary embodiment of the present disclosure is applied.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle body according to an exemplary embodiment of the present disclosure may include a roof structure including a roof side rail 11, a front structure including a front pillar 12, a rear structure including a rear pillar 14, and a floor structure including a side sill 13.

The roof structure may include a pair of roof side rails ii spaced apart from each other in a width direction of the vehicle, a plurality of roof crossmembers connecting the pair of roof side rails, and a roof panel supported by the pair of roof side rails and the plurality of roof crossmembers. In FIG. 1, only a left roof side rail is shown, and a right roof side rail is not shown. The roof structure including the roof side rails ii may be located on the top of the vehicle.

The front structure may include a dash panel 5 (see FIG. 2) extending in the width direction of the vehicle, and a pair of front pillars 12 coupled to opposed sides of the dash panel 5, respectively. In FIG. 1, only a left front pillar is shown, and a right front pillar is not shown. Each front pillar 12 may be coupled to a front portion of the corresponding roof side rail 11. A fender apron member 8 may extend from the front pillar 12 toward the front of the vehicle. The front structure including the front pillars 12 may be located on the front of the vehicle.

The rear structure may include a pair of rear pillars 14 spaced apart from each other in the width direction of the vehicle. In FIG. 1, only a left rear pillar is shown, and a right rear pillar is not shown. Each rear pillar 14 may be coupled to a rear portion of the corresponding roof side rail 11. The rear structure including the rear pillars 14 may be located on the rear of the vehicle.

The floor structure may include a floor 3 (see FIG. 2) forming the bottom of the vehicle body, and a pair of side sills 13 coupled to opposed side edges of the floor 3, respectively. In FIG. 1, only a left side sill is shown, and a right side sill is not shown. A front portion of each side sill 13 may be coupled to a lower portion of the corresponding front pillar 12, and a rear portion of the side sill 13 may be coupled to a lower portion of the corresponding rear pillar 14. The floor structure including the floor 3 and the side sills 13 may be located on the bottom of the vehicle.

Referring to FIG. 1, the roof side rail 11, the front pillar 12, the rear pillar 14, and the side sill 13 may define a door opening 15. FIG. 1 illustrates a center-pillarless vehicle body from which a center pillar is removed.

Figure 2:
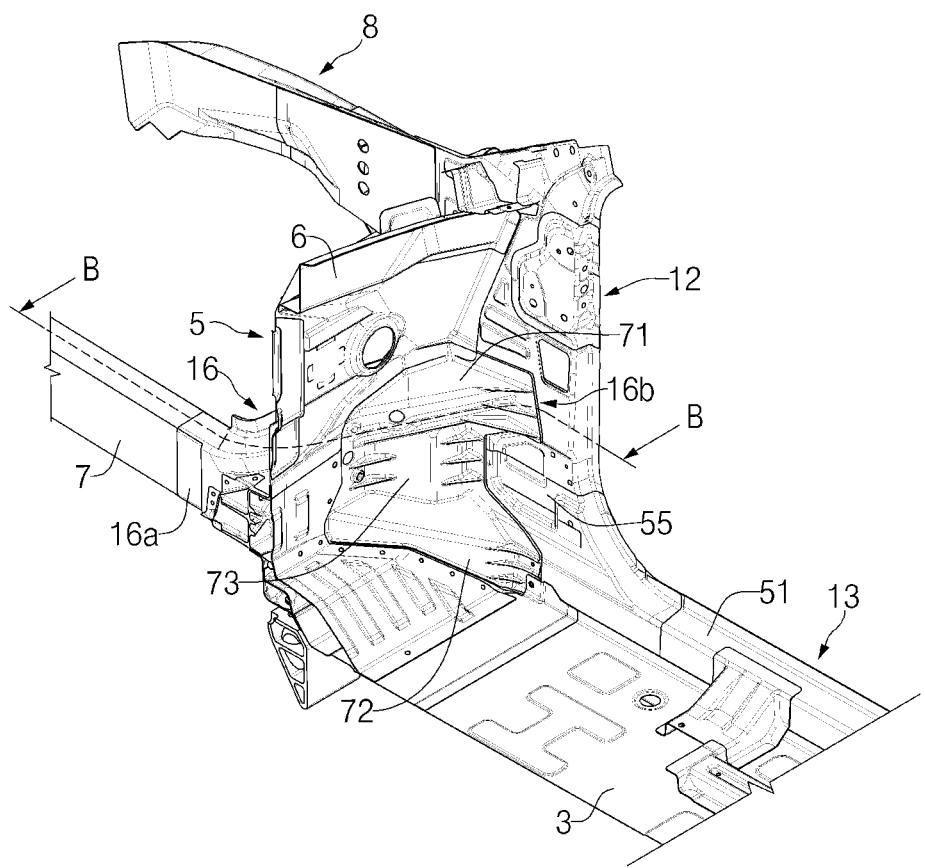
FIG. 2 illustrates a vehicle front pillar reinforcement system according to an exemplary embodiment of the present disclosure.

A pair of front side members may extend from the dash panel 5 toward the front of the vehicle, and each front side member may be located in front of the corresponding front pillar 12. Referring to FIG. 2, a right front side member 7 may extend from a right rear lower member 16 mounted on a right edge of the dash panel 5 toward the front of the vehicle. A left front side member (not shown) may extend from a left rear lower member (not shown) mounted on a left edge of the dash panel 5 toward the front of the vehicle. The rear lower members 16 may be fixed to the edges of the dash panel 5, respectively.

The dash panel 5 may be configured to divide a front compartment from a passenger compartment of the vehicle. The front compartment may be located in front of the dash panel 5, and a powertrain, transmission, and the like may be disposed in the front compartment. The passenger compartment may be located behind the dash panel 5, and vehicle seats, various convenience apparatuses, and the like may be disposed in the passenger compartment. A cowl member 6 may be disposed on a top edge of the dash panel 5, and the cowl member 6 may extend along the top edge of the dash panel 5 and the width direction of the vehicle. The cowl member 6 may cover a gap between a front windshield and a hood. Each end portion of the cowl member 6 may be fixed to the corresponding front pillar 12 using fasteners, welding, and/or the like. The dash panel 5 and the cowl member 6 may connect the pair of front pillars 12 in the width direction of the vehicle.

Referring to FIG. 2, each front pillar 12 and the corresponding side sill 13 may be coupled to the edge of the dash panel 5, and each rear lower member 16 may be fixed to the edge of the dash panel 5. Each front side member 7 may be located in front of the corresponding front pillar 12, and the front side member 7 may be coupled to the corresponding front pillar 12 and the corresponding side sill 13 through the corresponding rear lower member 16.

Figure 3:
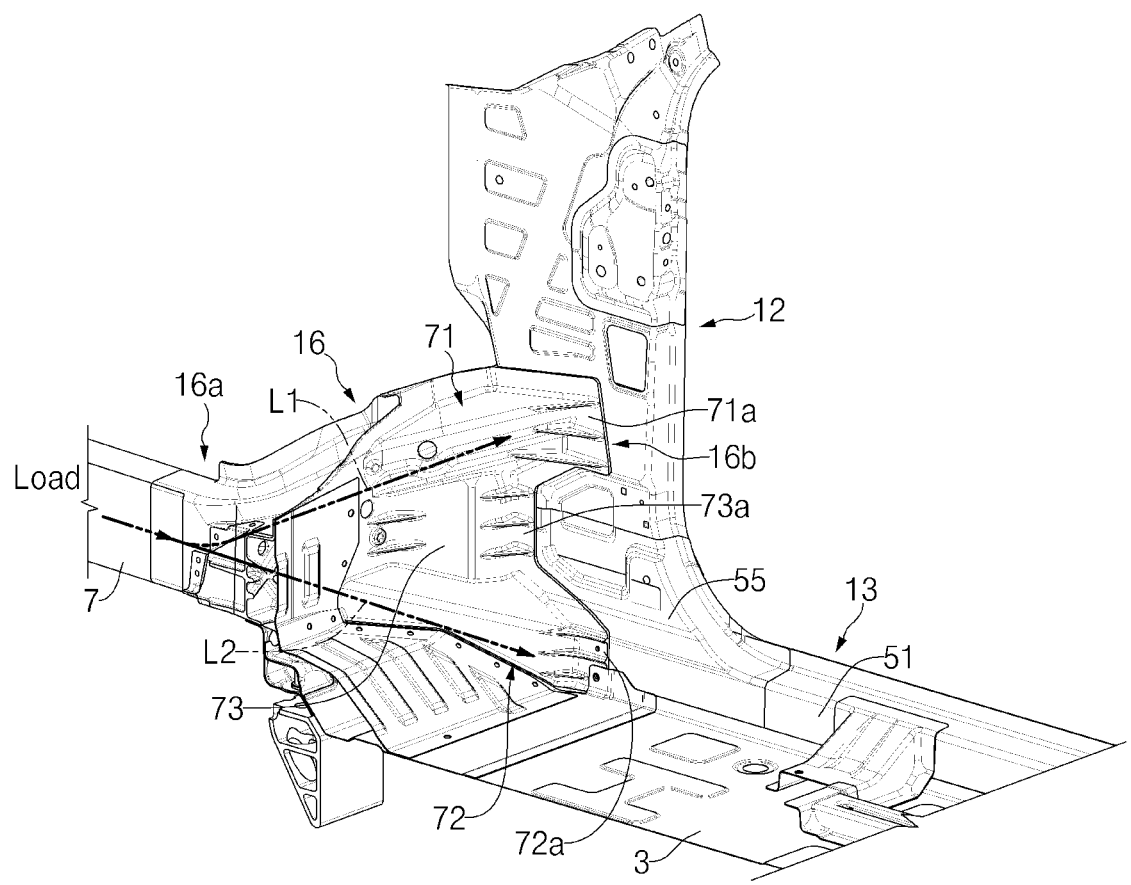
FIG. 3 illustrates the vehicle front pillar reinforcement system illustrated in FIG. 2, from which a dash panel is removed.

Referring to FIG. 3, the rear lower member 16 may include a front portion 16a coupled to the front side member 7 and a rear portion 10 fixed to the front pillar 12 and the side sill 13. The rear lower member 16 may connect a rear portion of the front side member 7 to the front portion of the corresponding side sill 13 and the lower portion of the front pillar 12. The rear lower member 16 may connect the rear portion of the front side member 7, the front portion of the side sill 13, and the lower portion of the front pillar 12 so that the front pillar 12, the front side member 7, the rear lower member 16, the front pillar 12, and the side sill 13 may define load paths in various directions (longitudinal direction, height direction, inclined direction, etc.) of the vehicle. Accordingly, the transfer of an impact load to the bottom of the floor 3 may be minimized, and thus the transfer of the impact load to a battery mounted under the floor 3 may be minimized.

Referring to FIG. 3, the rear lower member 16 may include an upper extension portion 71, a lower extension portion 72 located below the upper extension portion 71, and a middle extension portion 73 located between the upper extension portion 71 and the lower extension portion 72.

Referring to FIG. 3, the upper extension portion 71 may extend from the rear portion of the front side member 7 to the lower portion of the corresponding front pillar 12. The lower portion of the front pillar 12 may be located higher than the front side member 7, and the upper extension portion 71 may extend from the rear portion of the front side member 7 to the lower portion of the corresponding front pillar 12 in a diagonal direction to the extent corresponding to a height difference between the lower portion of the front pillar 12 and the front side member 7. The upper extension portion 71 may have a rear flange 71a fixed to the lower portion of the front pillar 12. A cross-sectional area of the upper extension portion 71 may gradually increase from a front portion thereof toward a rear portion thereof. Accordingly, the cross-sectional area of the upper extension portion 71 may gradually increase from the rear portion of the front side member 7 toward the lower portion of the front pillar 12. The upper extension portion 71 may have a closed cross section defined by a plurality of walls, and an impact load transferred to the front side member 7 may be transferred to the lower portion of the front pillar 12 along the upper extension portion 71. That is, the upper extension portion 71 may define a load path L1 extending diagonally between the rear portion of the front side member 7 and the lower portion of the front pillar 12.

Referring to FIG. 3, the lower extension portion 72 may extend from the rear portion of the front side member 7 to the front portion of the corresponding side sill 13. The side sill 13 may be located lower than the front side member 7, and the lower extension portion 72 may extend from the rear portion of the front side member 7 to the front portion of the corresponding side sill 13 in a diagonal direction to the extent corresponding to a height difference between the front side member 7 and the side sill 13. The lower extension portion 72 may have a rear flange 72a fixed to the side sill 13. The lower extension portion 72 may have a closed cross section defined by a plurality of walls, and a cross-sectional area of the lower extension portion 72 may gradually increase from a front portion thereof toward a rear portion thereof. Accordingly, the cross-sectional area of the lower extension portion 72 may gradually increase from the rear portion of the front side member 7 toward the front portion of the side sill 13. An impact load transferred to the front side member 7 may be transferred to the front portion of the side sill 13 along the lower extension portion 72. That is, the lower extension portion 72 may define a load path L2 extending diagonally between the rear portion of the front side member 7 and the front portion of the side sill 13.

Referring to FIG. 3, the middle extension portion 73 may be interposed between the upper extension portion 71 and the lower extension portion 72, and the middle extension portion 73 may extend from the rear portion of the front side member 7 to the front pillar 12 and the side sill 13. The middle extension portion 73 may have a rear flange 73a fixed to the lower portion of the front pillar 12 and the front portion of the side sill 13.

Figure 4:
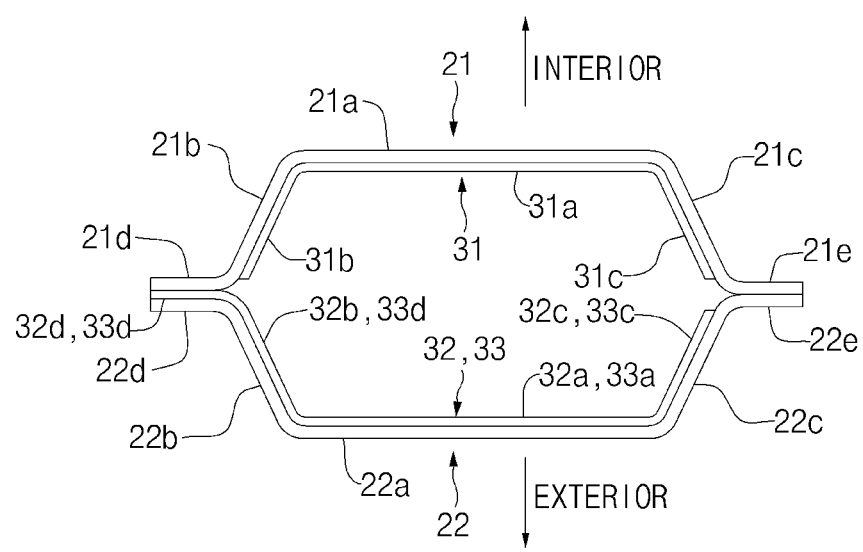
FIG. 4 illustrates a cross-sectional view, taken along line A-A of FIG. 1.

Referring to FIG. 4, the front pillar 12 may include a front pillar inner 21 facing the interior of the vehicle and a front pillar outer 22 facing the exterior of the vehicle.

The front pillar inner 21 may include an inboard side wall 21a facing the interior of the vehicle, a front wall 21b facing the front of the vehicle, a rear wall 21c facing the rear of the vehicle, a front flange 21d provided on the front wall 21b, and a rear flange 21e provided on the rear wall 21c. The front pillar inner 21 may have a cavity defined by the inboard side wall 21a, the front wall 21b, and the rear wall 21c, and the cavity of the front pillar inner 21 may be opened to the front pillar outer 22.

The front pillar outer 22 may include an outboard side wall 22a facing the exterior of the vehicle, a front wall 22b facing the front of the vehicle, a rear wall 22c facing the rear of the vehicle, a front flange 22d provided on the front wall 22b, and a rear flange 22e provided on the rear wall 22C. The front pillar outer 22 may have a cavity defined by the outboard side wall 22a, the front wall 22b, and the rear wall 22C, and the cavity of the front pillar outer 22 may be opened to the front pillar inner 21.

The front flange 21d of the front pillar inner 21 may be fixed to the front flange 22d of the front pillar outer 22 using fasteners, welding, and/or the like, and the rear flange 21e of the front pillar inner 21 may be fixed to the rear flange 22e of the front pillar outer 22 using fasteners, welding, and/or the like so that the front pillar inner 21 and the front pillar outer 22 may form a closed cross section.

Figure 5:
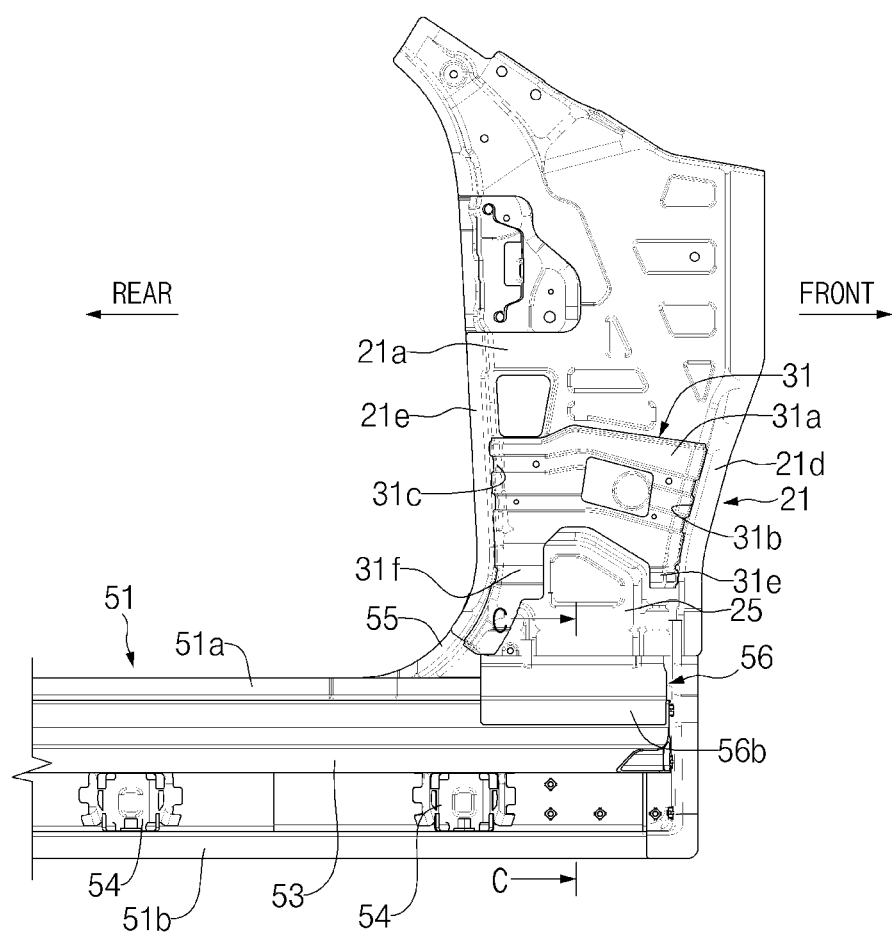
FIG. 5 illustrates a front pillar inner and a side sill inner in a vehicle front pillar reinforcement system according to an exemplary embodiment of the present disclosure.

Referring to FIG. 5, a front pillar inner reinforcement 31 may be received in the cavity of the front pillar inner 21, and the front pillar inner reinforcement 31 may be fixed to the front pillar inner 21 using fasteners, welding, and/or the like.

Referring to FIG. 4, the front pillar inner reinforcement 31 may include an inboard side wall 31a facing the interior of the vehicle, a front wall 31b provided on the front of the inboard side wall 31a, and a rear wall 31c provided on the rear of the inboard side wall 31a. The inboard side wall 31a of the front pillar inner reinforcement 31 may be fixed to the inboard side wall 21a of the front pillar inner 21 using fasteners, welding, and/or the like, the front wall 31b of the front pillar inner reinforcement 31 may be fixed to the front wall 21b of the front pillar inner 21 using fasteners, welding, and/or the like, and the rear wall 31c of the front pillar inner reinforcement 31 may be fixed to the rear wall 21c of the front pillar inner 21 using fasteners, welding, and/or the like.

The front pillar inner 21 may have the plurality of walls 21a, 21b, and 21c defining the cavity, and the front pillar inner reinforcement 31 may have the plurality of walls 31a, 31b, and 31c. The walls 31a, 31b, and 31c of the front pillar inner reinforcement 31 may be coupled to the walls 21a, 21b, and 21c of the front pillar inner 21 using fasteners, welding, and/or the like, respectively, so that the strength of the front pillar inner 21 may be increased, and accordingly deformation of the front pillar inner 21 caused by a load applied to the front pillar inner 21 may be minimized or prevented.

Figure 7:
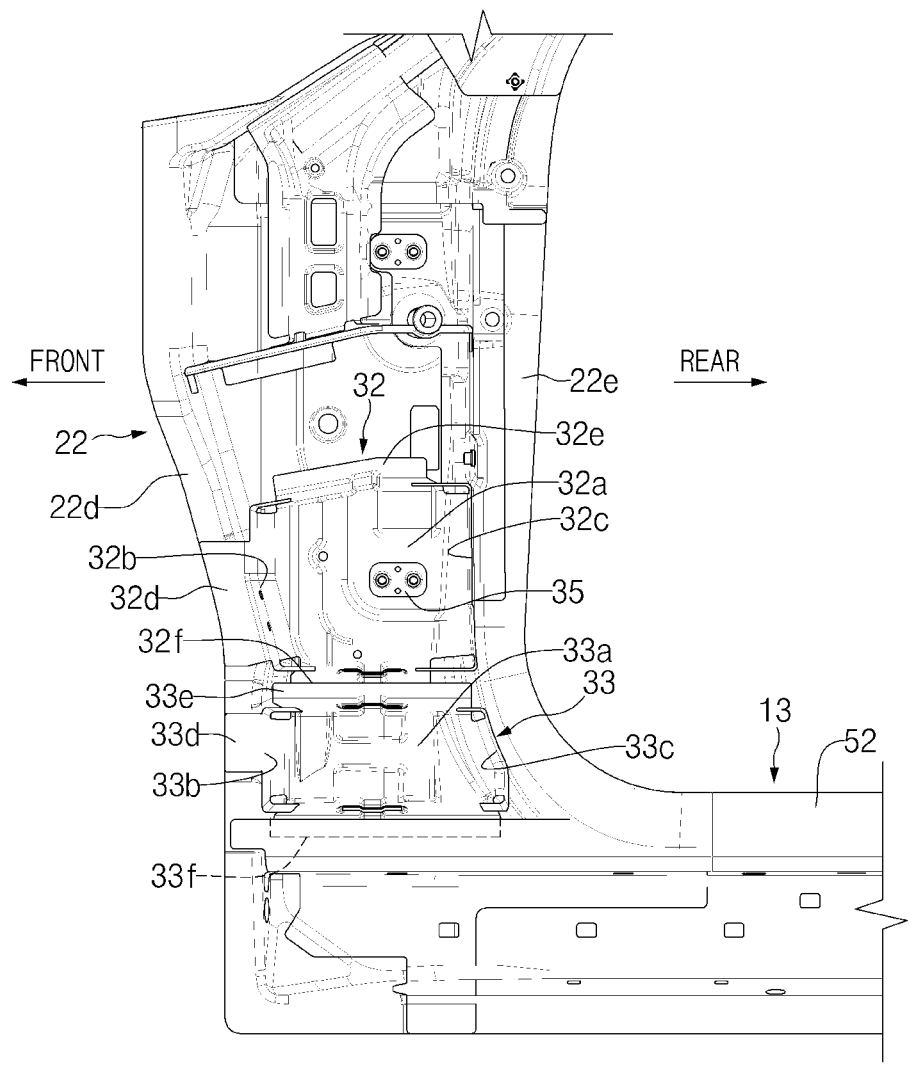
FIG. 7 illustrates a front pillar outer and a side sill outer in a vehicle front pillar reinforcement system according to an exemplary embodiment of the present disclosure.

Referring to FIG. 7, a front pillar outer reinforcement 32 may be received in the cavity of the front pillar outer 22, and the front pillar outer reinforcement 32 may be fixed to the front pillar outer 22 using fasteners, welding, and/or the like.

Referring to FIG. 4, the front pillar outer reinforcement 32 may include an outboard side wall 32a facing the exterior of the vehicle, a front wall 32b provided on the front of the outboard side wall 32a, and a rear wall 32c provided on the rear of the outboard side wall 32a. The outboard side wall 32a of the front pillar outer reinforcement 32 may be fixed to the outboard side wall 22a of the front pillar outer 22 using fasteners, welding, and/or the like, the front wall 32b of the front pillar outer reinforcement 32 may be fixed to the front wall 22b of the front pillar outer 22 using fasteners, welding, and/or the like, and the rear wall 32c of the front pillar outer reinforcement 32 may be fixed to the rear wall 22C of the front pillar outer 22 using fasteners, welding, and/or the like.

The front pillar outer 22 may have the plurality of walls 22a, 22b, and 22c defining the cavity, and the front pillar outer reinforcement 32 may have the plurality of walls 32a, 32b, and 32c. The walls 32a, 32b, and 32c of the front pillar outer reinforcement 32 may be coupled to the walls 22a, 22b, and 22C of the front pillar outer 22 using fasteners, welding, and/or the like, respectively, so that the strength of the front pillar outer 22 may be increased, and accordingly deformation of the front pillar outer 22 caused by a load applied to the front pillar outer 22 may be minimized or prevented.

Referring to FIG. 4, the front pillar outer reinforcement 32 may have a front flange 32d provided on the front wall 32b, and the front flange 32d of the front pillar outer reinforcement 32 may be interposed between the front flange 21d of the front pillar inner 21 and the front flange 22d of the front pillar outer 22. In particular, the front flange 32d of the front pillar outer reinforcement 32 may be fixed to the front flange 21d of the front pillar inner 21 and the front flange 22d of the front pillar outer 22 using fasteners, welding, and/or the like. As the front flange 32d of the front pillar outer reinforcement 32 is fixed to the front flange 21d of the front pillar inner 21 and the front flange 22d of the front pillar outer 22, connection stiffness between the front pillar inner 21 and the front pillar outer 22 may be sufficiently secured.

Referring to FIG. 7, the front pillar outer reinforcement 32 may include a door hinge mount 35, and the door hinge mount 35 may be integrally provided on the outboard side wall 32a of the front pillar outer reinforcement 32. The door hinge mount 35 may have one or more mounting holes for mounting a door hinge (not shown). The door hinge mount 35 may be integrally formed with the front pillar outer reinforcement 32 so that mounting stiffness of the door hinge may be increased.

Referring to FIG. 7, a lower reinforcement 33 may be received in the cavity of the front pillar outer 22 and may be located below the front pillar outer reinforcement 32. The lower reinforcement 33 may include an outboard side wall 33a facing the exterior of the vehicle, a front wall 33b provided on the front of the outboard side wall 33a, and a rear wall 33c provided on the rear of the outboard side wall 33a. The outboard side wall 33a of the lower reinforcement 33 may be fixed to the outboard side wall 22a of the front pillar outer 22 using fasteners, welding, and/or the like, the front wall 33b of the lower reinforcement 33 may be fixed to the front wall 22b of the front pillar outer 22 using fasteners, welding, and/or the like, and the rear wall 33c of the lower reinforcement 33 may be fixed to the rear wall 22c of the front pillar outer 22 using fasteners, welding, and/or the like.

The lower reinforcement 33 may have the plurality of walls 33a, 33b, and 33c, and the walls 33a, 33b, and 33c of the lower reinforcement 33 may be coupled to the walls 22a, 22b, and 22C of the front pillar outer 22 using fasteners, welding, and/or the like, respectively, so that the strength of the front pillar outer 22 may be increased, and accordingly deformation of the front pillar outer 22 caused by a load applied to the front pillar outer 22 may be minimized or prevented.

Referring to FIGS. 4 and 7, the lower reinforcement 33 may have a front flange 33d provided on the front wall 33b, and the front flange 33d of the lower reinforcement 33 may be interposed between the front flange 21d of the front pillar inner 21 and the front flange 22d of the front pillar outer 22. In particular, the front flange 33d of the lower reinforcement 33 may be fixed to the front flange 21d of the front pillar inner 21 and the front flange 22d of the front pillar outer 22 using fasteners, welding, and/or the like. As the front flange 33d of the lower reinforcement 33 is fixed to the front flange 21d of the front pillar inner 21 and the front flange 22d of the front pillar outer 22, connection stiffness between the front pillar inner 21 and the front pillar outer 22 may be sufficiently secured.

The front pillar inner reinforcement 31 may be fixed to the front pillar inner 21, and the front pillar outer reinforcement 32 and the lower reinforcement 33 may be fixed to the front pillar outer 22 so that the front pillar inner reinforcement 31 may face the front pillar outer reinforcement 32 and the lower reinforcement 33. In particular, the front pillar outer reinforcement 32 of the front pillar outer 22 may face an upper portion of the front pillar inner reinforcement 31 of the front pillar inner 21, and the lower reinforcement 33 may face a lower portion of the front pillar inner reinforcement 31 of the front pillar inner 21.

Figure 6:
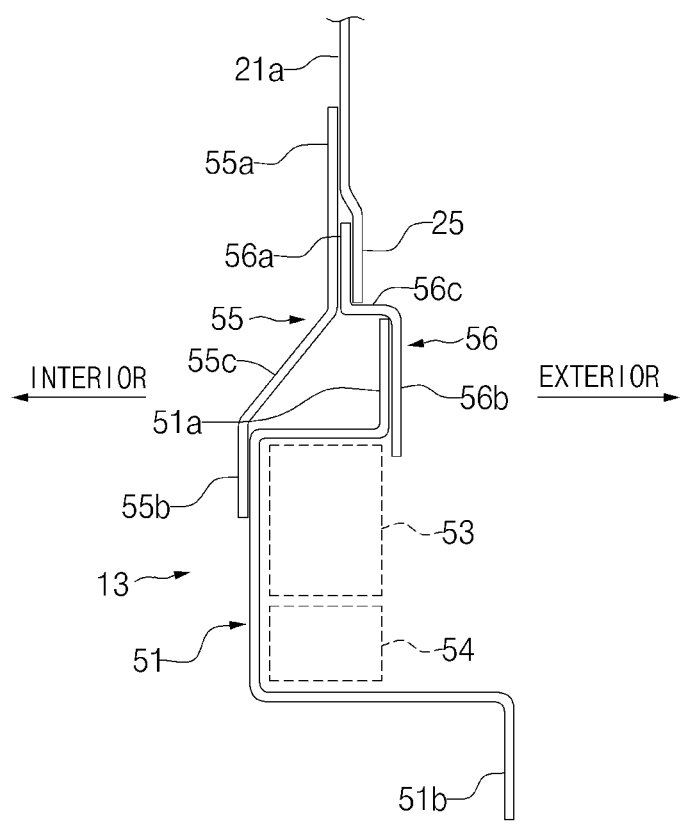
FIG. 6 illustrates a cross-sectional view, taken along line C-C of FIG. 5.

The side sill 13 may include a side sill inner 51 (see FIGS. 3 and 5) facing the interior of the vehicle, and a side sill outer 52 (see FIG. 7) facing the exterior of the vehicle. A front portion of the side sill inner 51 may be coupled to the front pillar inner 21, and a front portion of the side sill outer 52 may be coupled to the front pillar outer 22. Referring to FIGS. 5 and 6, the side sill inner 51 may have a top flange 51a and a bottom flange 51b. A side sill reinforcement 53 and a plurality of bulk heads 54 may be inserted in a cavity of the side sill inner 51. The side sill reinforcement 53 and the plurality of bulk heads 54 may be interposed between the side sill inner 51 and the side sill outer 52, and the plurality of bulk heads 54 may be located below the side sill reinforcement 53.

Referring to FIGS. 5 and 6, the front pillar inner 21 may have a recessed wall 25 which is recessed from the inboard side wall 21a toward the exterior of the vehicle (that is, the front pillar outer 22). The front pillar inner reinforcement 31 may have extension portions 31e and 31f surrounding the recessed wall 25. The recessed wall 25 may face the door hinge mount 35 of the front pillar outer 22, and the recessed wall 25 may increase support stiffness of the door hinge mount 35 of the front pillar outer 22.

Referring to FIGS. 3 and 5, the side sill inner 51 may further include a side sill front member 55 coupled to the front portion thereof, and the side sill front member 55 may connect the front pillar inner 21 and the side sill inner 51.

Referring to FIG. 6, the side sill front member 55 may include an upper portion 55a coupled to a lower portion of the front pillar inner 21, a lower portion 55b coupled to the front portion of the side sill inner 51, and a connection portion 55c connecting the upper portion 55a and the lower portion 55b. The upper portion 55a may be fixed to a lower portion of the inboard side wall 21a of the front pillar inner 21 using fasteners, welding, and/or the like, and the lower portion 55b may be fixed to an inboard-side surface of the front portion of the side sill inner 51 using fasteners, welding, and/or the like. The connection portion 55c may extend diagonally. The side sill front member 55 may firmly connect the front pillar inner 21 and the side sill inner 51 so that connection stiffness between the front pillar 12 and the side sill 13 may be significantly increased.

Referring to FIG. 5, the side sill inner 51 may further include a front reinforcement 56 fixed to the front portion thereof. Referring to FIG. 6, the side sill front member 55 may be coupled to the inboard-side surface of the side sill inner 51, and the front reinforcement 56 may be coupled to an outboard-side surface of the side sill inner 51. That is, the side sill front member 55 and the front reinforcement 56 may face each other with the side sill inner 51 interposed therebetween.

The front reinforcement 56 may at least partially overlap a portion of the front pillar 12 and a portion of the side sill 13 and be fixed therebetween. As the front reinforcement 56 partially overlaps the front pillar 12 and the side sill 13, connection stiffness between the front pillar 12 and the side sill 13 may be increased.

Referring to FIG. 6, the front reinforcement 56 may include an upper portion 56a interposed between the front pillar inner 21 and the side sill front member 55, a lower portion 56b coupled to the front portion of the side sill inner 51 and the side sill reinforcement 53, and a connection portion 56c connecting the upper portion 56a and the lower portion 56b. The upper portion 56a may be interposed between the recessed wall 25 of the front pillar inner 21 and the upper portion 55a of the side sill front member 55. The front reinforcement 56 may be fixed to the recessed wall 25 of the front pillar inner 21 and the upper portion 55a of the side sill front member 55 using fasteners, welding, and/or the like. The lower portion 56b may be fixed to the top flange 51a of the side sill inner 51 and the side sill reinforcement 53 using fasteners, welding, and/or the like. The connection portion 56c may extend horizontally. As the front reinforcement 56 connects the recessed wall 25 of the front pillar inner 21, the side sill front member 55, the side sill reinforcement 53, and the side sill inner 51, connection stiffness between the front pillar 12 and the side sill 13 may be sufficiently secured.

Referring to FIG. 7, the front pillar outer reinforcement 32 may have a top flange 32e provided on a top edge thereof and a bottom flange 32f provided on a bottom edge thereof. The lower reinforcement 33 may have a top flange 33e provided on a top edge thereof and a bottom flange 33f provided on a bottom edge thereof. The top flange 32e of the front pillar outer reinforcement 32 may be fixed to the outboard side wall 22a of the front pillar outer 22 using fasteners, welding, and/or the like. The bottom flange 32f of the front pillar outer reinforcement 32 may partially overlap and be fixed to the top flange 33e of the lower reinforcement 33 using fasteners, welding, and/or the like. The bottom flange 33f of the lower reinforcement 33 may be fixed to the side sill outer 52 of the side sill 13 using fasteners, welding, and/or the like. The front pillar outer reinforcement 32, the lower reinforcement 33, and the side sill outer 52 may be coupled to each other in the height direction of the vehicle so that a load path may be defined in the height direction of the vehicle.

Referring to FIG. 3, the rear flange 71a of the upper extension portion 71 may be fixed to an inboard-side surface of the front pillar inner 21 using fasteners, welding, and/or the like so that the upper extension portion 71 may be coupled to the front pillar inner 21. The rear flange 72a of the lower extension portion 72 may be fixed to an inboard-side surface of the side sill front member 55 of the side sill inner 51 using fasteners, welding, and/or the like so that the lower extension portion 72 may be coupled to the side sill inner 51. The rear flange 73a of the middle extension portion 73 may be fixed to the inboard-side surface of the front pillar inner 21 and the inboard-side surface of the side sill front member 55 using fasteners, welding, and/or the like.

Figure 8:
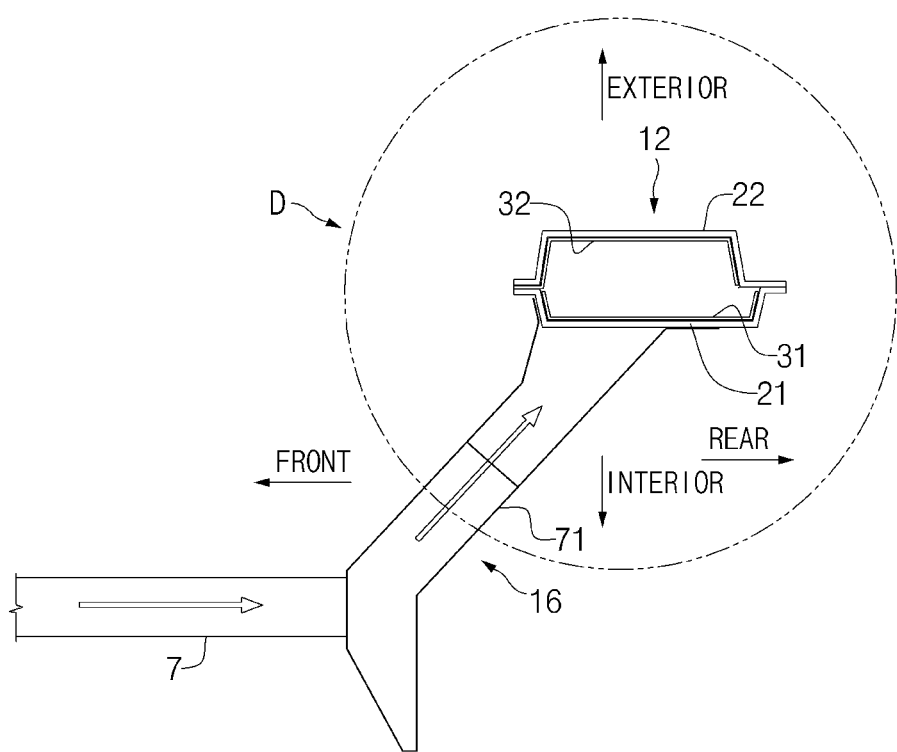
FIG. 8 illustrates a cross-sectional view, taken along line B-B of FIG. 2.
Figure 9:
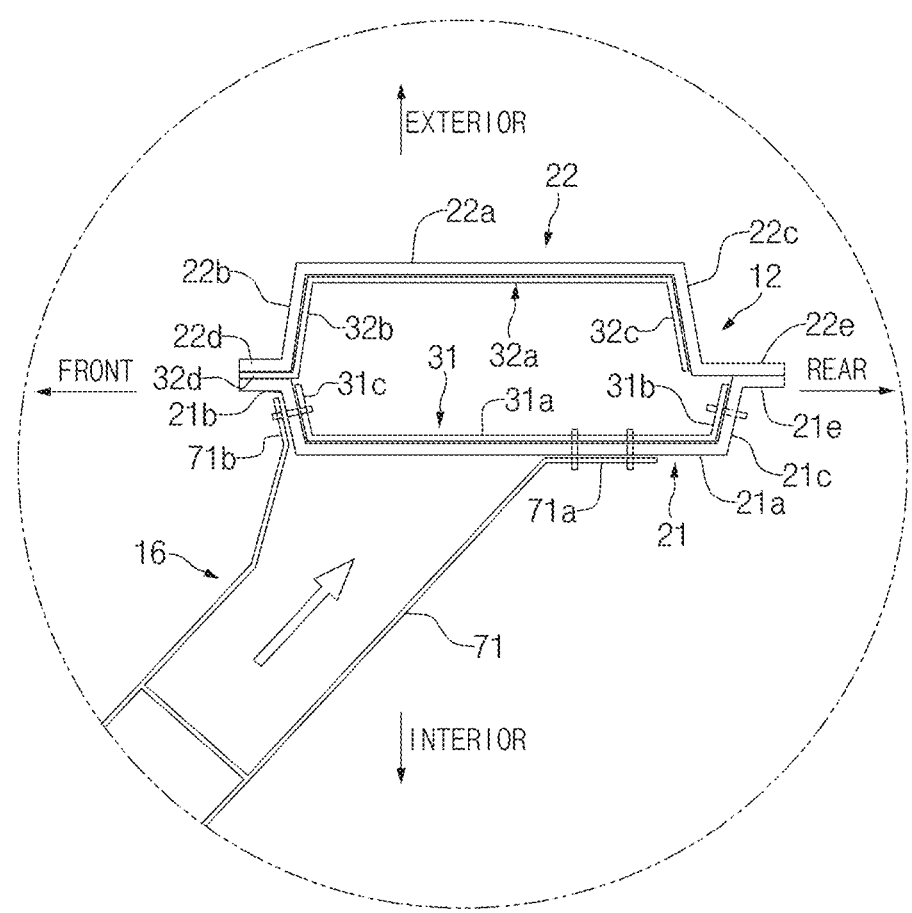
FIG. 9 illustrates an enlarged view of portion D of FIG. 8.

Referring to FIGS. 8 and 9, the rear flange 71a of the upper extension portion 71 may be aligned with the front pillar inner reinforcement 31 and the front pillar outer reinforcement 32, and accordingly stiffness of the front pillar inner 21 and the front pillar outer 22 may be increased.

Referring to FIG. 9, the rear flange 71a of the upper extension portion 71 may be fixed to the inboard side wall 21a of the front pillar inner 21 of the front pillar 12 using fasteners, welding, and/or the like. The upper extension portion 71 may include a front flange 71b facing the front of the vehicle, and the front flange 71b of the upper extension portion 71 may be fixed to the front wall 21b of the front pillar inner 21 using fasteners, welding, and/or the like. The upper extension portion 71 may be coupled to the front pillar inner 21 through the front flange 71b and the rear flange 71a so that connection stiffness between the rear lower member 16 and the front pillar 12 may be sufficiently secured.

The upper extension portion 71 of the rear lower member 16 may be firmly fixed to the front pillar inner 21. Even when a barrier hits the rear lower member 16 and the front pillar 12 during a small overlap crash test, the front pillar outer 22 may be partially deformed, but the front pillar inner 21 may not be deformed or deformation of the front pillar inner 21 may be minimized.

As set forth above, according to exemplary embodiments of the present disclosure, the front pillar inner reinforcement may be received in the cavity of the front pillar inner so that the strength of the front pillar inner may be improved. When an impact load is transferred to the front pillar inner, deformation of the front pillar inner may be minimized or prevented.

According to exemplary embodiments of the present disclosure, the front pillar outer reinforcement may be received in the cavity of the front pillar outer so that strength of the front pillar outer may be improved. When an impact load is transferred to the front pillar outer, deformation of the front pillar outer may be minimized or prevented.

According to exemplary embodiments of the present disclosure, the side sill front member and the front reinforcement may connect the front pillar inner and the side sill inner so that connection stiffness between the front pillar and the side sill may be improved. The above-described vehicle front pillar reinforcement system according to exemplary embodiments of the present disclosure may be configured to increase the stiffness of the front pillar even when applied to a center-pillarless vehicle from which a center pillar is removed, thereby improving strength and crashworthiness of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A front pillar reinforcement system of a vehicle, the front pillar reinforcement system comprising:
   a front pillar inner comprising a first plurality of walls defining a first cavity;
   a front pillar outer facing the front pillar inner and comprising a second plurality of walls defining a second cavity; and
   a front pillar inner reinforcement received in the first cavity of the front pillar inner and comprising a third plurality of walls coupled to the first plurality of walls of the front pillar inner, respectively;
   wherein the first plurality of walls of the front pillar inner comprises an inboard side wall facing an interior of the vehicle, a front wall facing a front of the vehicle, and a rear wall facing a rear of the vehicle;
   wherein the first cavity of the front pillar inner is defined by the inboard side wall, the front wall, and the rear wall; and
   wherein the third plurality of walls of the front pillar inner reinforcement comprises an inboard side wall coupled to the inboard side wall of the front pillar inner, a front wall coupled to the front wall of the front pillar inner, and a rear wall coupled to the rear wall of the front pillar inner.

2. The front pillar reinforcement system according to claim 1, further comprising a front pillar outer reinforcement received in the second cavity of the front pillar outer and comprising a fourth plurality of walls coupled to the second plurality of walls of the front pillar outer, respectively.

3. The front pillar reinforcement system according to claim 2, wherein:
   the second plurality of walls of the front pillar outer comprises an outboard side wall facing an exterior of the vehicle, a front wall facing a front of the vehicle, and a rear wall facing a rear of the vehicle; and
   the second cavity of the front pillar outer is defined by the outboard side wall, the front wall, and the rear wall.

4. The front pillar reinforcement system according to claim 3, wherein the fourth plurality of walls of the front pillar outer reinforcement comprises an outboard side wall coupled to the outboard side wall of the front pillar outer, a front wall coupled to the front wall of the front pillar outer, and a rear wall coupled to the rear wall of the front pillar outer.

5. The front pillar reinforcement system according to claim 2, further comprising a lower reinforcement received in the second cavity of the front pillar outer and located below the front pillar outer reinforcement, the lower reinforcement comprising a fifth plurality of walls coupled to the second plurality of walls of the front pillar outer, respectively.

6. The front pillar reinforcement system according to claim 5, wherein the fifth plurality of walls of the lower reinforcement comprises an outboard side wall coupled to an outboard side wall of the front pillar outer, a front wall coupled to a front wall of the front pillar outer, and a rear wall coupled to a rear wall of the front pillar outer.

7. A front pillar reinforcement system of a vehicle, the front pillar reinforcement system comprising:
   a front pillar inner comprising a first plurality of walls defining a first cavity;
   a front pillar outer facing the front pillar inner and having a second plurality of walls defining a second cavity; and
   a front pillar inner reinforcement received in the first cavity of the front pillar inner and comprising a third plurality of walls coupled to the first plurality of walls of the front pillar inner, respectively;
   a side sill inner coupled to the front pillar inner; and
   a side sill front member coupled to a front portion of the side sill inner and connecting the front pillar inner and the side sill inner;
   wherein the first plurality of walls of the front pillar inner comprises an inboard side wall facing an interior of the vehicle, a front wall facing a front of the vehicle, and a rear wall facing a rear of the vehicle;

wherein the first cavity of the front pillar inner is defined by the inboard side wall, the front wall, and the rear wall; and wherein the third plurality of walls of the front pillar inner reinforcement comprises an inboard side wall coupled to the inboard side wall of the front pillar inner, a front wall coupled to the front wall of the front pillar inner, and a rear wall coupled to the rear wall of the front pillar inner.

8. The front pillar reinforcement system according to claim 7, wherein the side sill front member comprises an upper portion coupled to the front pillar inner and a lower portion coupled to the side sill inner.

9. The front pillar reinforcement system according to claim 7, further comprising a front reinforcement coupled to the front portion of the side sill inner, wherein the front reinforcement partially overlaps a portion of the front pillar and a portion of the side sill and is fixed therebetween.

10. The front pillar reinforcement system according to claim 9, wherein:
the front pillar inner comprises a recessed wall recessed toward an exterior of the vehicle; and
the front reinforcement comprises an upper portion interposed between the recessed wall of the front pillar inner and the side sill front member and a lower portion coupled to the front portion of the side sill inner.

11. The front pillar reinforcement system according to claim 7, further comprising:
a rear lower member coupled to the front pillar inner and the side sill inner, the rear lower member comprising an upper extension portion coupled to the front pillar inner and a lower extension portion coupled to the side sill inner; and
a front side member extending from the rear lower member toward a front of the vehicle.

12. The front pillar reinforcement system according to claim 11, wherein the upper extension portion is aligned with the front pillar inner reinforcement.

13. The front pillar reinforcement system according to claim 11, wherein the upper extension portion comprises a front flange fixed to the front wall of the front pillar inner and a rear flange fixed to the inboard side wall of the front pillar inner.

14. The front pillar reinforcement system according to claim 7, further comprising a front pillar outer reinforcement received in the second cavity of the front pillar outer and comprising a fourth plurality of walls coupled to the second plurality of walls of the front pillar outer, respectively.

15. The front pillar reinforcement system according to claim 14, wherein:
the second plurality of walls of the front pillar outer comprises an outboard side wall facing an exterior of the vehicle, a front wall facing a front of the vehicle, and a rear wall facing a rear of the vehicle; and
the second cavity of the front pillar outer is defined by the outboard side wall, the front wall, and the rear wall.

16. The front pillar reinforcement system according to claim 14, further comprising a lower reinforcement received in the second cavity of the front pillar outer and located below the front pillar outer reinforcement, the lower reinforcement comprising a fifth plurality of walls coupled to the second plurality of walls of the front pillar outer, respectively.

17. A vehicle body comprising:
a dash panel extending in a width direction of the vehicle body;
a roof side rail;
a front pillar coupled to an end of the dash panel and to a front portion of the roof side rail, the front pillar comprising a front pillar inner comprising a first plurality of walls defining a first cavity and a front pillar outer facing the front pillar inner and comprising a second plurality of walls defining a second cavity;
a front pillar inner reinforcement received in the first cavity of the front pillar inner and comprising a third plurality of walls coupled to the first plurality of walls of the front pillar inner, respectively;
a rear pillar coupled to a rear portion of the roof side rail; and
a side sill coupled to a side edge of a floor, wherein a front portion of the side sill is coupled to a lower portion of the front pillar and a rear portion of the side sill is coupled to a lower portion of the rear pillar;
wherein the first plurality of walls of the front pillar inner comprises an inboard side wall facing an interior of the vehicle body, a front wall facing a front of the vehicle, and a rear wall facing a rear of the vehicle;
wherein the first cavity of the front pillar inner is defined by the inboard side wall, the front wall, and the rear wall; and
wherein the third plurality of walls of the front pillar inner reinforcement comprises an inboard side wall coupled to the inboard side wall of the front pillar inner, a front wall coupled to the front wall of the front pillar inner, and a rear wall coupled to the rear wall of the front pillar inner.

18. The vehicle body according to claim 17, further comprising a front pillar outer reinforcement received in the second cavity of the front pillar outer and comprising a fourth plurality of walls coupled to the second plurality of walls of the front pillar outer, respectively.

19. The vehicle body according to claim 18, wherein:
the second plurality of walls of the front pillar outer comprises an outboard side wall facing an exterior of the vehicle body, a front wall facing a front of the vehicle body, and a rear wall facing a rear of the vehicle body;
the second cavity of the front pillar outer is defined by the outboard side wall, the front wall, and the rear wall; and
the fourth plurality of walls of the front pillar outer reinforcement comprises an outboard side wall coupled to the outboard side wall of the front pillar outer, a front wall coupled to the front wall of the front pillar outer, and a rear wall coupled to the rear wall of the front pillar outer.

20. The vehicle body according to claim 18, further comprising a lower reinforcement received in the second cavity of the front pillar outer and located below the front pillar outer reinforcement, the lower reinforcement comprising a fifth plurality of walls, wherein the fifth plurality of walls of the lower reinforcement comprises an outboard side wall coupled to an outboard side wall of the front pillar outer, a front wall coupled to a front wall of the front pillar outer, and a rear wall coupled to a rear wall of the front pillar outer.

* * * * *